Dec. 3, 1963  R. W. EICHLER ETAL  3,112,819
CLUTCH MECHANISM
Original Filed July 2, 1959  5 Sheets-Sheet 2

INVENTOR.
ROLF W. EICHLER
ROGER H. EICHORN
JOHN RUTKUS, JR.
BY
ATTORNEY

Dec. 3, 1963 R. W. EICHLER ETAL 3,112,819
CLUTCH MECHANISM
Original Filed July 2, 1959 5 Sheets-Sheet 4

INVENTOR.
ROLF W. EICHLER
ROGER H. EICHORN
JOHN RUTKUS, JR.
BY
ATTORNEY

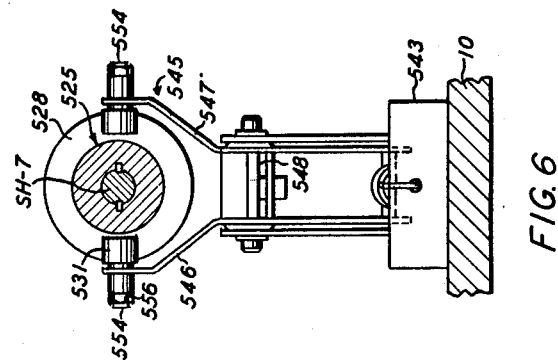
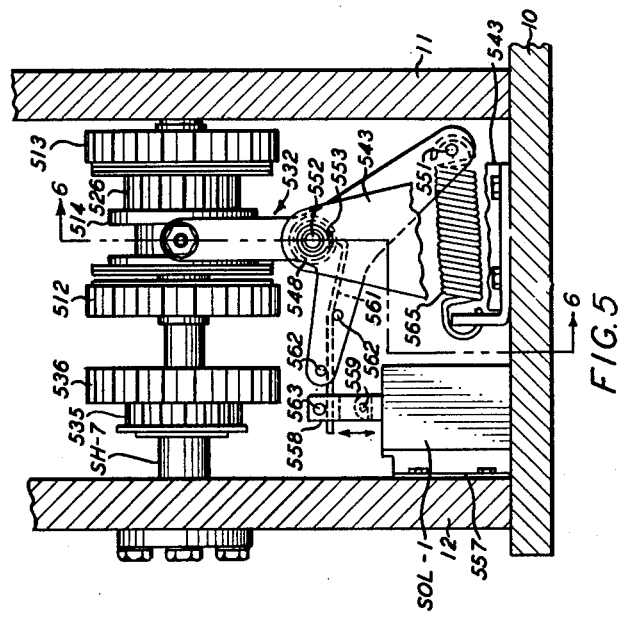

United States Patent Office 3,112,819
Patented Dec. 3, 1963

3,112,819
CLUTCH MECHANISM
Rolf W. Eichler, Fairport, Roger H. Eichorn, Webster, and John Rutkus, Jr., Penfield, N.Y., assignors to Xerox Corporation, a corporation of New York
Original application July 2, 1959, Ser. No. 824,659, now Patent No. 2,945,434, dated July 19, 1960. Divided and this application July 18, 1960, Ser. No. 43,456
2 Claims. (Cl. 192—89)

This invention relates to a paper feed mechanism and, in particular, to a clutch mechanism to effect the sequential operation of a paper feed mechanism. This application is a division of copending Eichler et al. application Serial No. 824,659, filed July 2, 1959, now Patent No. 2,945,434.

More specifically, the invention relates to an improved clutch mechanism for sequentially operating the separator and feed rollers of a paper feed mechanism, although it is not specifically limited thereto.

Although clutch mechanisms are well-known, their use in paper feed mechanisms has been limited because of the high cost of a conventional clutch mechanism and because of inherent problems found in the paper feeding art wherein the operation of the paper feed mechanism must be coordinated with the operation of the element or elements to which the paper is fed.

It is therefore the principal object of this invention to improve clutch mechanism for use in controlling the sequence of operation of a paper feed mechanism.

A further object of this invention is to improve clutch mechanisms whereby the clutch elements are spring biased into operative relation to each other to provide a cushioning of parts when coupling together the drive and driven elements of the clutch mechanism.

These and other objects of the invention are attained by means of a clutch mechanism including a shaft journaled for rotation, a first clutch element and a second clutch element rotatably mounted on the shaft in spaced apart complementary relation to each other, a third clutch element adjustably positioned on the shaft between the first clutch element and the second clutch element, and spring biased means to shift the third clutch element into driving relation with the first clutch element or in driving relation with the second clutch element.

For a better understanding of the invention as well as other objects and further features thereof, reference is had to the following detailed description of the invention to be read in connection with the accompanying drawings, wherein:

FIG. 5 is a front view of the clutch mechanism of the paper feed system; and,

FIG. 6 is a sectional view taken along line 6—6 of FIG. 5.

Figure 1:
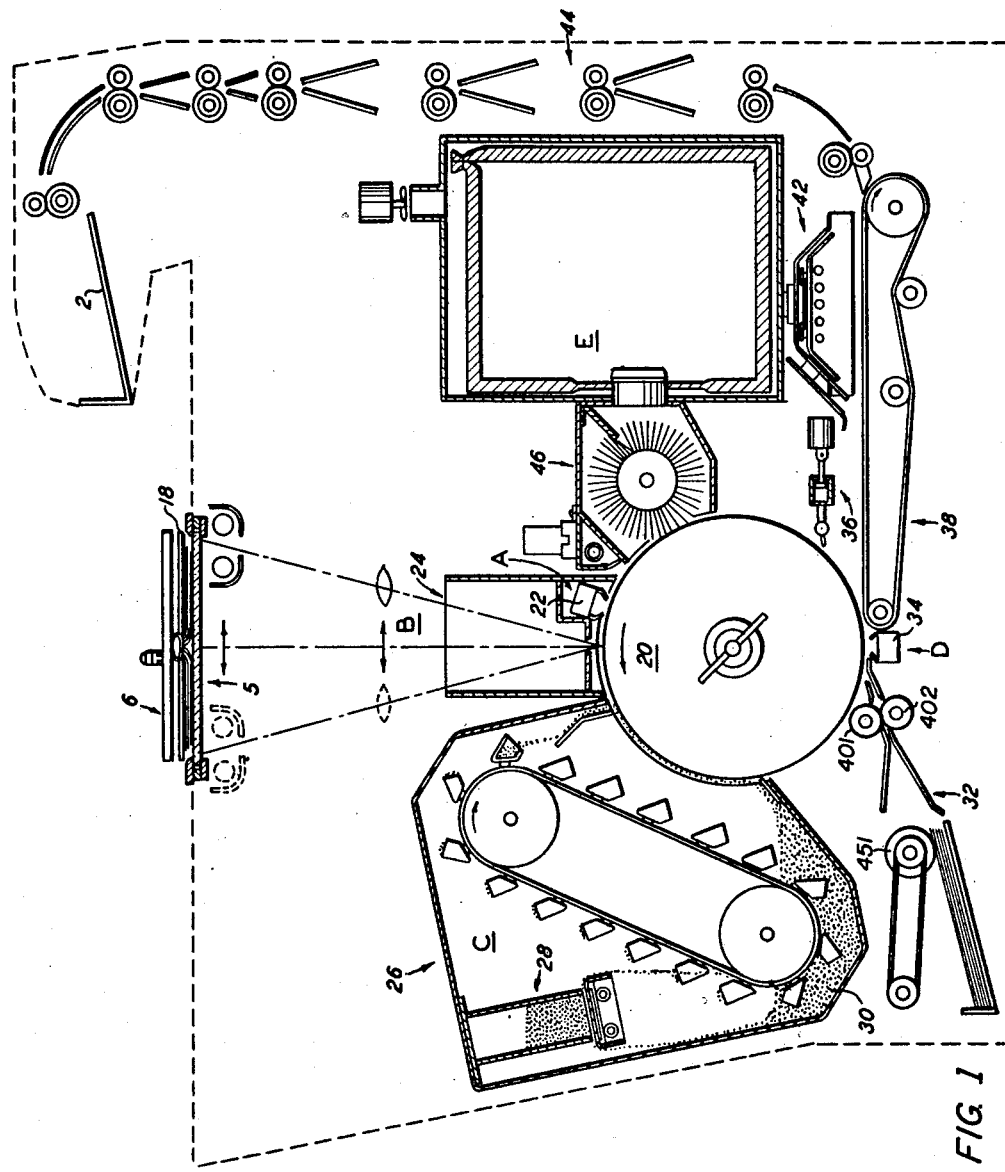
FIG. 1 illustrates schematically a preferred embodiment of a xerographic apparatus adapted for continuous and automatic operation and incorporating an optical scanning mechanism.

As shown schematically in FIG. 1, the xerographic apparatus comprises a xerographic plate including a photoconductive layer or light-receiving surface on a conductive backing and formed in the shape of a drum, generally designated by numeral 20, which is mounted on a shaft journaled in a frame to rotate in the direction indicated by the arrow to cause the drum surface sequentially to pass a plurality of xerographic processing stations.

The charging station is preferably located as indicated by reference character A. In general, the charging apparatus or corona charging device 22 includes a corona discharge array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project a line copy image onto the surface of the photoconductive xerographic drum from a stationary original. To permit substantially any type of original copy, including books, magazines and other types of cumbersome three-dimensional objects to be copied for the reproduction of specific information contained thereon, the optical projection system shown is of the type disclosed in copending Mayo application, Serial No. 783,388, filed December 29, 1958, now Patent No. 3,062,094.

The optical scanning or projection assembly, generally designated 24, comprises a stationary copyboard 5 which may consist of a transparent plate member such, as for example, a glass plate or the like positioned parallel to the top of the desk, which is adapted to support a master or original, such as book 18 placed face downward on its upper surface, the copyboard being uniformly illuminated and arranged in light-projecting relation to the moving light-receiving surface of the xerographic drum 20. Uniform lighting is provided by a pair of lamps attached to a slotted light reflector mounted for movement to traverse the plane of the copyboard.

A light shield adapted to protect the xerographic drum from extraneous light is positioned adjacent to the surface of the xerographic drum. A slot aperture in the light shield extends transversely to the path of movement of the light-receiving surface of the xerographic drum 20 to permit reflected rays from the copyboard to be directed against a limited transverse area of the light-receiving surface as it passes therebeneath. As shown, the light shield also encloses the corona charging device 22.

To enable the optical system to be enclosed within a conventional-size desk, a folded optical system including an object mirror, a lens, and an image mirror is used in the preferred embodiment of the invention.

The lens element positioned between the copyboard and the light shield is arranged for movement in a path to traverse the plane of the copyboard in timed relation to the movement of the light source, whereby the subject image of the original supported by the copyboard is scanned in timed relation to the movement of the light-receiving surface of the xerographic drum to project a light image corresponding to the subject image onto the surface of the xerographic drum.

Adjacent to the exposure station is a developing station C in which there is positioned a developer apparatus 26 including a casing or housing having a lower or sump portion for accumulating developing material 30. A bucket-type conveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser generally designated 28 is used to accurately meter toner to the developing material.

Positioned next and adjacent to the developing station is the image transfer station D which includes suitable sheet feeding mechanism adapted to feed sheets of paper successively to the xerographic drum in coordination with the presentation of the developed image on the drum at the transfer station. This sheet feeding mechanism, generally designated 32, includes a sheet source such as a tray for a plurality of sheets of a suitable transfer material that is, typically, sheets of paper or the like, a separating roller 451 adapted to feed the top sheet of the stack to feed rollers 401 and 402 which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum guides are positioned on opposite sides of the feed rollers.

The transfer of the xerographic powder image from the drum surface to the transfer material is effected by means of a corona transfer device 34 that is located at or immediately after the point of contact between the transfer material and the rotating drum.

Immediately subsequent to the image transfer station is positioned a transfer material stripping apparatus or paper pickoff mechanism, generally designated 36, for removing the transfer material from the drum surface. This device includes a plurality of small diameter, multiple outlet conduits of a manifold that is supplied with pressurized aeriform fluid by a pulsator operated by a suitable power means. The pulsator is adapted to force jets of pressurized aeriform fluid through the outlets conduits into contact with the surface of the drum slightly in advance of the sheet material to strip the leading edge of the sheet material from the drum surface and to direct it onto an endless conveyor 38 whereby the sheet material is carried to a fixing device, such as, for example, heat fuser 42, whereby the developed and transferred xerographic powder image on the sheet material is permanently fixed thereto.

After fusing, the finished copy is preferably discharged from the apparatus at a suitable point for collection externally of the apparatus. To accomplish this there is provided a vertical conveyor, generally designated 44, by means of which the copy is delivered to a copyholder 2 positioned in a suitable super-structure overhanging the rear portion of the desk top.

The next and final station in the device is a drum cleaning station E, having positioned therein a drum cleaning device 46 adapted to remove any powder remaining on the xerographic drum after transfer by means of a rotating bush and whereby the xerographic drum is flooded with light to cause dissipation of any residual electrical charge remaining on the xerographic drum.

As shown, there is provided a frame for supporting the components of the apparatus formed by a base plate 10 to which are mounted full front and rear plates 11 and 12, respectively, and partial plate 13. The plates are connected together and maintained rigidly in spaced relation to each other by suitable tie plates, not shown.

Figure 2:
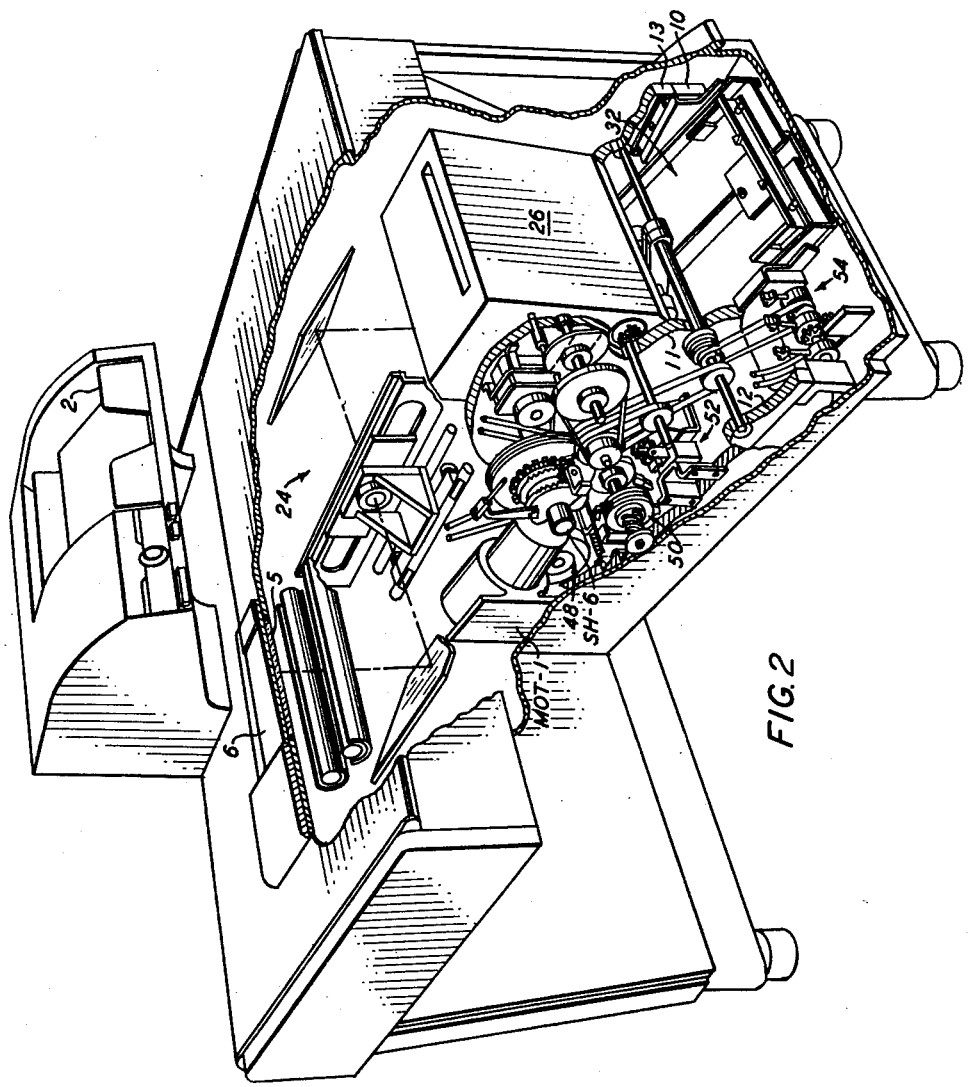
FIG. 2 is a left-hand perspective view of the xerographic apparatus with parts of the desk covering of the apparatus broken away to show the arrangement of the xerographic machine element.

As shown in FIG. 2, the xerographic drum 20 is mounted on horizontal driven shaft SH6 and the drum is positioned on the exposed front face of front plate 11, with the major xerographic components of the machine mounted around the drum either on the exposed front face of plate 11 or between plate 11 and partial plate 13.

The main drive elements and controls for the xerographic components are mounted between front and rear plates 11 and 12, respectively, as shown in FIG. 2, and they include as major components thereof, a main drive motor MOT1, a scan control mechanism 48 for operating the movable elements of the optical system 24, a programmer 50 for actuating the operation of the paper feed system 32 and paper pickoff mechanism 36, a clutch mechanism 52 for effecting alternate operation of the separator and feed rollers in the paper feed system, and a lever control system 54, for adjusting the length of scan, toner dispensing rate, and separator roller tension.

It is believed that the foregoing description is sufficient for the purpose of this application to show the general operation of a xerographic copier-duplicator. For further details concerning the specific construction of the xerographic copier-duplicator shown, reference is made to copending Mayo et al. application, Serial No. 824,500, filed July 2, 1959, now Patent No. 3,062,109.

*Clutch Mechanism*

Both the operation of the paper separator rolls 451 and the paper feed rolls 401 is effected by clutch mechanism 52 having separate clutch drives, the selection of the drives being controlled by means of a solenoid-operated clutch shifter actuated by the programmer 50 of the type disclosed in copending Eichler et al. application, Serial No. 824,657, filed July 2, 1959.

Referring now to the subject matter of the invention, both the operation of the paper separator rolls 451 and the paper feed roll 401 is effected by means of a clutch mechanism 52 constructed in accordance with the invention.

Figure 4:
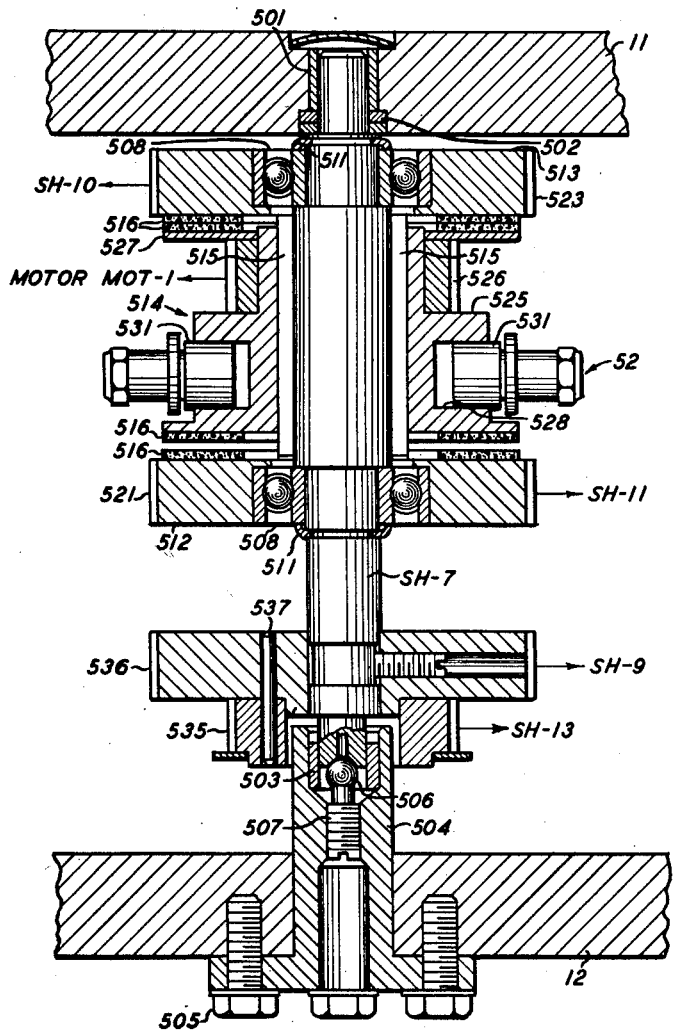
FIG. 4 is a section view of the clutch mechanism of the paper feed system.

As illustrated in FIGS. 4, 5 and 6, a preferred embodiment of the invention, the clutch mechanism 52, which is supported and housed by the frame plates 11 and 12, includes a horizontal driven shaft SH7 that rotates at one end in bearing 501 mounted in frame 11, the shoulder of the shaft at this end riding against thrust washers 502 also mounted in frame 11.

At its opposite end the shaft SH7 is journaled in bearing 503 mounted in flanged bearing bracket 504 which extends through frame 12 and is secured thereto by bolts 505. Axial alignment and end thrust of the shaft is controlled by means of thrust ball 506 engaged in the socket formed in the end of shaft SH7 and in the socket of screw 507 threaded into bearing bracket 504.

The inner races of bearings 508 mounted on shaft SH7 against bearing locating shoulders formed on the shaft are secured in position by bearing retainers 511 located in suitable grooves in the shaft adjacent the bearings. The outer races of the bearings 508 support complementary clutch elements 512 and 513 which are free to rotate relative to the shaft. A third clutch element 514, adapted to coact with complementary clutch elements 512 and 513, is fitted on shaft SH7 in interposed relation to clutch elements 512 and 513 and is free for relative movement with respect to the axis of the shaft SH7, but is connected to the shaft for rotation therewith by means of keys 515. All three clutch elements are of the annular plate type, but element 514 differs from the others in that it presents two oppositely facing frictional pads 516 respectively in opposed relation to the inwardly facing frictional pads 516 of clutch elements 512 and 513.

The frictional surfaces of clutch element 514 are spaced from the opposed surfaces of clutch elements 512 and 513 to permit axial movement of clutch element 514 whereby it may be selectively engaged with either clutch element 512 or clutch element 513.

Figure 3:
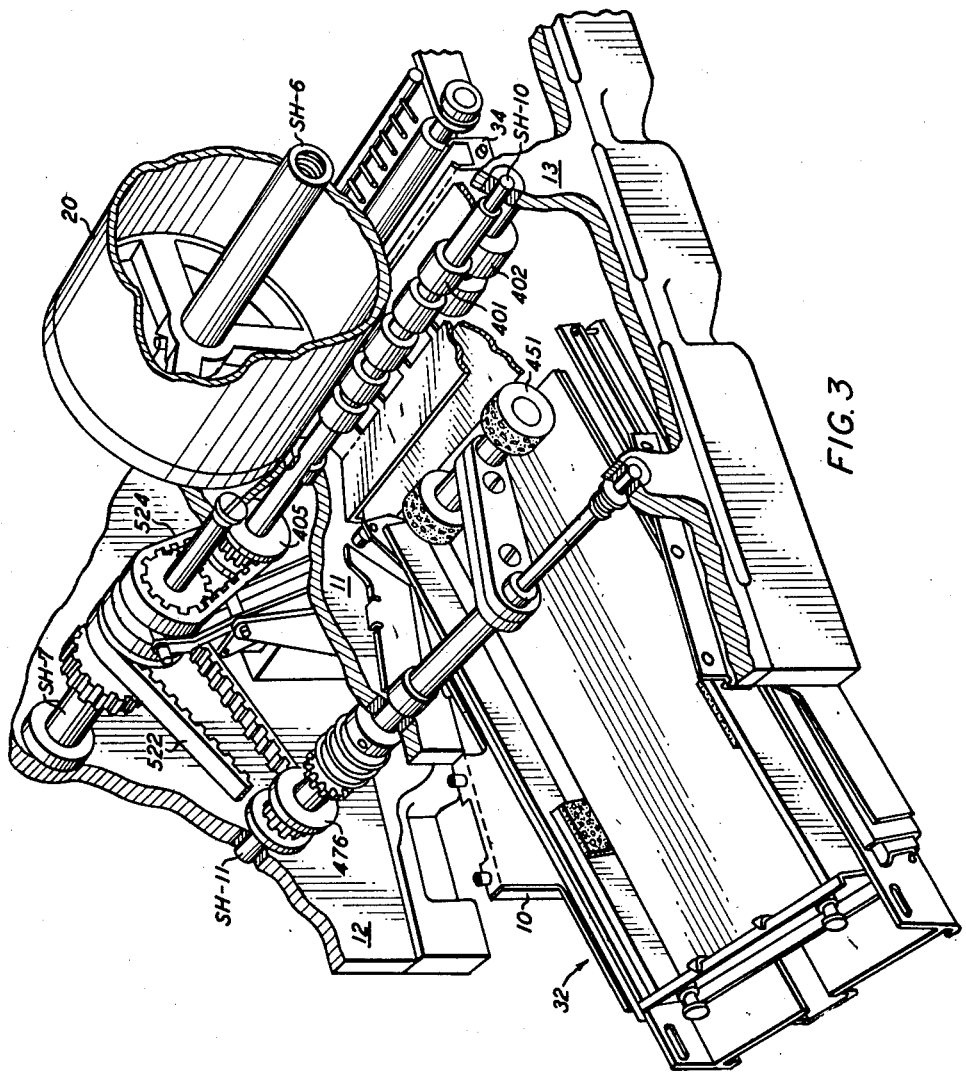
FIG. 3 is a right-hand perspective view, partly in section, of the paper feed mechanism of the apparatus.

Clutch element 512 is provided with peripheral teeth 521 and is in effect a drive pulley wheel adapted to be connected, as shown in FIG. 3, by timing belt 522 to driven pulley 476 mounted on shaft SH11 to drive the paper separator rolls. In a similar manner, clutch element 513 is provided with peripheral teeth 523 and is in effect a drive pulley wheel adapted to be connected by timing belt 524 to driven pulley 405 mounted on shaft SH10 to drive the paper feed roll 401.

Clutch element 514 includes a hub 525 fixedly supporting ring pulley 526 and annular plate 527 staked onto its reduced portion, the friction elements of the clutch element being secured to flanged end of hub 525 and annular plate 527, respectively. The hub 525 is provided with an annular groove 528 adapted to receive the rollers 531 of the yoke mechanism described hereinafter whereby the clutch element 514 may selectively be moved into or out of engagement with either of the clutch elements 512 and 513. The ring pulley 526 is adapted to be connected by a timing belt, not shown, to a pulley mounted on the main drive motor MOT1, whereby the shaft SH7 is continually rotated while the machine is in operation.

Secured as by set screws to the left-hand end of the shaft SH7 are a pair of pulleys 535 and 536 connected together by pins 537, pulley 535 being adapted to be connected by a belt to drive the toner dispenser 28 and pulley 536 being adapted to be connected by a belt to drive the conveyor of the developer apparatus 26.

The clutch shifter mechanism for shifting clutch element 514 with respect to clutch elements 512 and 513 includes a shifter bracket 543 mounted on base plate 10. A forked double crank lever 545 which consists of two Y levers 546 and 547 held in spaced parallel relation to each other by spacer sleeve 548 and by the rod 551 is rotatably mounted on spindle 552 positioned in the upright legs of shifter bracket 543, the spindle 552 being retained in position by snap rings 553 inserted in suitable grooves at opposite ends of the spindle. As shown, spacer sleeve 548 encircles spindle 522.

Rollers 531 adapted to ride in the groove 528 in clutch element 514 are rotatably secured to the inner faces of the Y levers 546 and 547 at the forked end of the double crank lever 545 by means of roller bolts 554 inserted in the rollers, passing through the Y levers to engage lock nuts 556. The normally open solenoid SOL-1 connected to a suitable electric circuit, is mounted by means of solenoid bracket 557 to frame 12. The plunger of the solenoid SOL-1 is notched to receive clevis 558 pivotally secured to the plunger by clevis pin 559.

Spacer sleeve 548 is provided with a longitudinal slot to receive the bent end of actuator spring 561 which extends over and under split pins 562 in the crank lever to be secured by retainer pin 563 in the forked end of clevis 558, whereby the rollers on the crank lever may be forced to the left in FIG. 4 to shift clutch element 514 into engagement with clutch element 512 when the solenoid 501 is energized.

Normally clutch element 514 is forced into driving relationship with clutch element 513 by means of the rollers which are normally biased to the right by tension spring 565 connected at one end to the upright leg of shifter bracket 543 and at its other end engaging rod 551. The tension of spring 565 should be great enough to supply the required pressure between coacting clutch elements 514 and 513 while still permitting solenoid SOL-1 to overcome the force of the spring to bring clutch element 514 into operational relationship with clutch element 512.

Referring now back to the operation of the separator rollers 451 and the feed rollers 401 and 402, when the paper separator rollers 451 are driven by the clutch element 512, the clutch element 513 for driving roller 401 is disengaged from the power source by disengagement from clutch element 514 when solenoid SOL-1 is energized. As the rollers 451 are driven they forward a sheet of transfer material into the bite of rollers 401 and 402 where its forward motion is momentarily stopped. As the movement of a sheet of transfer material under rollers 451 continues after the leading edge of the sheet has been stopped by rollers 401 and 402, the sheet is buckled as the rollers continue to rotate. The rotation of rollers 451 is continued just sufficiently to bow the paper whereby the resiliency of the paper forces the leading edge of the sheet into transverse alignment with the rollers 401 and 402, irrespective of its original alignment thereto, so that the paper is forwarded by said rollers in correct alignment with the drum as roller 401 is activated when solenoid SOL-1 is de-energized, permitting clutch element 514 to engage clutch element 513 through the biasing action of spring 565.

With a clutch mechanism of the invention the feed rollers are normally driven except when the clutch element 514 is shifted to engage clutch element 512 to drive the rollers 451 as previously described. Since the leading edge of a stack of paper is always positioned at a pre-determined location, the operating time of the rollers 451 to separate and advance a sheet to the feed rollers can be set to obtain the desired amount of buckle of the sheets as fed to the feed rollers. Then the feed rollers can be operated in the manner shown, until the next feeding sequence, so that the feed rollers can transport any size sheet to the desired delivery station, such as drum 20.

The actuator spring 561 and the tension spring permit the engagement of clutch element 514 with either clutch element 512 or clutch element 513, respectively, without undue shock or excessive slippage between the clutch faces as they become engaged while still permitting maximum clutching engagement between the clutch elements as engaged.

While the invention has been described with reference to the structures disclosed herein, it is not confined to the details set forth, and this application is intended to cover such modification or changes as may come within the purposes of the improvements or the scope of the following claims.

What is claimed is:
1. A clutch mechanism including
a frame,
a shaft journaled in said frame,
a first clutch element,
a second clutch element, said first clutch element and said second clutch element being positioned in spaced complementary relation to each other on said shaft and positioned thereon for relative rotation with respect to said shaft and to each other,
a driven clutch element adapted to coact with said first clutch element and with said second clutch element, said driven clutch element being mounted on said shaft for axial movement thereon between said first clutch element and said second clutch element,
lever means connected to said driven clutch element,
a first spring means connected at one end to said frame and at its other end to said lever for normally biasing said lever in a direction to bias said driven clutch element into driving relation with said clutch element,
power means,
and a leaf spring means having an end connected to said lever and an unsecured portion engageable with said power means to be actuated thereby for moving said lever against the biasing action of said first spring means to move said driven clutch element into driving relation with said second clutch element.

2. A clutch mechanism including
a frame,
a shaft journaled in said frame,
a first clutch element,
a second clutch element, said first clutch element and said second clutch element being positioned in spaced complementary relation to each other on said shaft and rotatably mounted thereon for relative rotation with respect to said shaft and with respect to each other, a driven clutch element mounted on said shaft between said first clutch element and said second clutch element, said driven clutch element being slideably positioned on said shaft for engagement with said first clutch element when in a first position and for engagement with said second clutch element when in a second position, lever means connected to said driven clutch element, a spring means connected at one end to said frame and at its other end to said lever for actuating said lever to normally bias said driven clutch into said first position in driving relationship with said first clutch element, a leaf spring connected at one end to said lever and having an unsecured portion, and power means, said power means being provided with means to engage the unsecured portion of said leaf spring for shifting said driven clutch element through said lever into driving relation with said second clutch element at said second position.

References Cited in the file of this patent

UNITED STATES PATENTS

| | | |
|---|---|---|
| 2,169,089 | Davenport | Aug. 8, 1939 |
| 2,403,208 | Bechler | July 2, 1946 |
| 2,499,031 | Moore | Feb. 28, 1950 |
| 2,579,791 | Carter | Dec. 25, 1951 |
| 2,630,197 | Morgenstern | Mar. 3, 1953 |
| 2,766,637 | Bock | Oct. 16, 1956 |
| 2,857,770 | Johnson | Oct. 28, 1958 |
| 2,881,597 | Jacobs | Apr. 14, 1959 |